3,364,278
CONVERSION OF ETHYLENE TO BUTENES

Robert E. Reusser, Bartlesville, Okla., assignor to Phillips Petroleum Company, a corporation of Delaware
No Drawing. Filed Dec. 17, 1964, Ser. No. 419,193
9 Claims. (Cl. 260—683.15)

ABSTRACT OF THE DISCLOSURE

Ethylene is converted to butenes by use of a catalyst comprising a reaction mixture of an organoaluminum compound such as diethylethoxyaluminum and a complex of cobalt with a beta-diketone such as cobalt acetylacetonate.

---

This invention relates to a method for the conversion of ethylene to butenes. In another aspect this invention relates to a catalyst for the conversion of ethylene to butenes.

Heretofore although a large amount of ethylene has been converted into polyethylene and ethylene-based chemicals such as ethylene oxide, ethylene glycol and the like, there exists at various times a substantial excess of ethylene over that required for polymer or ethylene-based chemical production. Although various processes have been proposed for the conversion of ethylene to other compounds, few of such processes have proved technically feasible due to relatively low conversion yields.

Quite unexpectedly, it has been found that ethylene can be converted to butenes in high yields by contacting same under reaction conditions with a catalytic amount of a reaction product formed by mixing an organoaluminum compound of the formula:

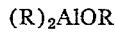

and a complex of cobalt with a beta-diketone of the formula:

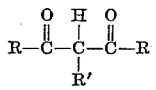

wherein R is at least one radical selected from the group consisting of alkyl, aryl, alkaryl, aralkyl, and cycloalkyl, each having from 1 to 8 carbon atoms, preferably alkyl radicals having from 1 to 4 carbon atoms, R' is selected from the group consisting of R and hydrogen, preferably hydrogen.

Accordingly, it is an object of this invention to provide a new method for the conversion of ethylene to butenes. It is another object of this invention to provide a new catalyst for the conversion of ethylene to butenes.

Other aspects, objects and the several advantages of the invention will be readily apparent to those skilled in the art from the description and the appended claims.

According to this invention ethylene is converted to butenes in high yield by means of a catalyst comprising the reaction product resulting from the reaction of a complex of cobalt with a beta-diketone and organoaluminum compound both as defined above. The reaction of the complex of cobalt with the organoaluminum compound can take place over a wide range of temperatures; however, the reaction temperature will generally range from about 0 to about 200° C. The reaction time is quite short, generally on the order of a few minutes, and the mol ratio of the organoaluminum compound to cobalt complex, although it too can vary widely, will generally range from about 2/1 to about 100/1, preferably from about 2/1 to about 10/1.

Representative examples of organoaluminum compounds which can be employed as one of the components of the catalyst system of this invention are: dimethylmethoxyaluminum, diethylethoxyaluminum, diisobutylethoxyaluminum, diethylmethoxyaluminum, diisobutylmethoxyaluminum, diisopropyl-n-butoxyaluminum, dicyclohexylethoxyaluminum, diphenylphenoxyaluminum, di(p - tolyl)ethoxyaluminum, di(benzyl)-n-butoxyaluminum, di-n-octyloctoxyaluminum, and the like.

Representative examples of compounds which can be employed as the beta-diketones with which the cobalt is complexed are: 2,4-pentanedione(acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 2,2-dimethyl-3,5-nonanedione, 1-cyclohexyl-1,3-butanedione, 1-phenyl-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3-butanedione, 1-phenyl-2-benzyl-1,3-butanedione, 1-phenyl-3-benzyl-9,11-nonadecanedione, 8,10 - heptadecanedione, 8-ethyl-7,9-heptadecanedione, 6-octyl-5,7-undecanedione, 4-phenyl-3,5-heptanedione, and the like.

Preferred combinations of the above organoaluminum compounds and beta-diketones are diethylethoxyaluminum and acetylacetone, diisobutylethoxyaluminum and acetylacetone, diethylmethoxyaluminum and acetylacetone, diisobutylmethoxyaluminum and acetylacetone, diethylethoxyaluminum and 2,4-hexanedione, diisobutylethoxyaluminum and 2,4-hexanedione, diethylmethoxyaluminum and 2,4-hexanedione, and diisobutylmethoxyaluminum and 2,4-hexanedione.

The method of conversion of ethylene to butenes of this invention is carried out by contacting ethylene with the above-defined catalyst system under reaction conditions which include an inert hydrocarbon diluent. Although others are known in the art representative inert hydrocarbon diluents include n-hexane, n-heptane, isooctane, cyclohexane, methylcyclohexane, benzene, toluene, xylene and the like. The conversion is generally carried out at a temperature in the range of from about 0 to about 200° C., preferably from about 25 to about 125° C. The pressure in the reaction zone will be autogenous and can range as high as several thousand pounds per square inch depending upon the chosen reaction temperature and the chosen diluent. The reaction time can vary widely, but will generally range from less than 1 minute to about 10 minutes but can be as long as several days. The amount of catalyst system present in the mixture of cobalt complex, organoaluminum compound and inert hydrocarbon diluent can also vary over a wide effective catalytic range but will generally be in the range of from about 0.5 to about 10 weight percent based on the foregoing mixture of catalyst system and inert diluent.

EXAMPLE I

Ethylene was converted to butenes in the presence of a catalyst system comprising the reaction product of cobalt acetylacetonate (CoAA) and diethylethoxyaluminum.

In this example, 1.32 grams of CoAA was charged to a 10-ounce bottle and dissolved in 100 ml. of benzene. Following this, 35 ml. of diethylethoxyaluminum as a 0.17 gram/cc. solution in cylcohexane was added. Then 6.60 grams of hexene-1 was added as a standard criteria for use in subsequent chromatographic analysis. The resulting solution turned to a slightly brown-pink color and substantially all the solids present were dissolved. The catalyst was then placed in a 300 ml. autoclave under nitrogen and pressured to 700 p.s.i. with ethylene while the stirrer was turned at 1200 r.p.m. No heat was supplied to the autoclave but the temperature rose sharply and the ethylene pressure began to fall immediately. Additional ethylene was added periodically for about 40 minutes at a rate which maintained the temperature of the autoclave substantially at but below 75° C. At the end of the 40-minute period the off-gas from the autoclave was sampled and the liquid organic layer in the autoclave was withdrawn and analyzed.

The off-gas analysis by gas-liquid chromatographic analysis gave the following results:

| Component: | Weight percent |
|---|---|
| Oxygen | 0.1 |
| Nitrogen | 32.5 |
| Ethylene | 35.9 |
| Butene-1 | 2.0 |
| Trans-butene-2 | 17.2 |
| Cis-butene-2 | 5.9 |
| Hexene-1 | 6.5 |

The organic layer in the autoclave amounted to 185 ml. at a density of 0.78 grams/cc. Gas-liquid chromatographic analysis of this material gave the following results:

| Component: | Weight percent |
|---|---|
| Benzene | 64.3 |
| Ethylene | 0.3 |
| Butene | 29.4 |
| Isobutene + butene-1 | 0.9 |
| Trans-butene-2 | 20.2 |
| Cis-butene-2 | 8.3 |
| Hexene | 5.8 |
| Octene | 0.2 |
| Dodecene | 0.1 |

The total weight of the product organic layer was 144.2 grams, including the benzene diluent, of which 42.4 grams was butenes product. The amount of hexene-1 present above the 6.60 gms. added as a standard criteria was 1.75 grams.

EXAMPLE II

An attempt was made to convert ethylene to butenes in a process similar to that of Example I in which process 1.3 grams of CoAA, 100 ml. of benzene and 25 ml. of a 15 weight percent solution of n-butyllithium in n-hexene were contacted after which ethylene was contacted with the reaction product at 700 p.s.i.

No reaction occurred at temperatures from 70 to 150° C. nor at 200° C. and 1800 p.s.i. for 65 minutes.

EXAMPLE III

An attempt to convert ethylene to butenes was made in a process similar to that of Example I wherein 1.30 grams of nickel acetylacetonate (NiAA) and 33 ml. of an 0.813 gram/ml. solution of diethylethoxyaluminum in cyclohexane was contacted with ethylene at 700 p.s.i. and 175° C.

No reaction occurred after 1.5 hours at these conditions.

EXAMPLE IV

An attempt to convert ethylene to butenes was made in a process similar to that of Example I wherein 1.3 grams of manganese acetylacetonate (MnAA) and 35 ml. of an 0.813 gram/ml. solution of diethylethoxyaluminum in cyclohexane was contacted with ethylene at 700 p.s.i. and 175° C.

No reaction occurred after 1.5 hours at these conditions.

EXAMPLE V

An attempt to convert ethylene to butenes was made in a process similar to that of Example I wherein 1.5 grams of magnesium acetylacetonate (MgAA) and 15 ml. of a diethylethoxyaluminum solution in cyclohexane, each ml. of solution containing 0.00624 mols of diethylethoxyaluminum, were contacted with ethylene at 700 p.s.i. and 175° C.

No reaction occurred after 1.5 hours at these conditions.

The above examples show that organolithium compounds are not substitutes for organoaluminum compounds. The examples also show that other metals are not substitutes for cobalt in the complex with a beta-diketone of this invention.

Reasonable variations and modifications are possible within the scope of this disclosure without departing from the spirit and scope of the invention.

I claim:

1. A method for converting ethylene to butenes comprising contacting under conditions for converting ethylene to butenes, ethylene and a catalytic amount of a catalyst consisting essentially of a reaction mixture of an organoaluminum compound of the formula $(R)_2AlOR$ and a complex of cobalt with a beta-diketone of the formula

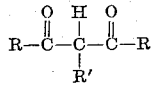

where each R is a radical selected from the group consisting of alkyl, aryl, alkaryl, aralkyl and cycloalkyl radicals each having from 1 to 8 carbon atoms per molecule and R' is selected from the group consisting of R and hydrogen.

2. The method according to claim 1 wherein R is an alkyl radical having from 1 to 4 carbon atoms per molecule and R' is hydrogen.

3. A method for converting ethylene to butenes comprising contacting under conditions for converting ethylene to butenes including an inert hydrocarbon diluent, ethylene and a catalytic amount of a catalyst consisting essentially of that formed by reacting diethylethoxyaluminum and cobalt acetylacetonate.

4. The method according to claim 3 wherein the mixture of diethylethoxyaluminum and cobalt acetylacetonate is present in the hydrocarbon diluent in the range of from about 0.5 to about 10 weight percent of the combined mixture of diethylethoxyaluminum, cobalt acetylacetonate and hydrocarbon diluent.

5. A method for converting ethylene to butenes comprising mixing under conditions for converting ethylene to butenes including a hydrocarbon diluent, temperature of from about 0 to about 200° C., ethylene and a catalytic amount of a catalyst consisting essentially of that formed by reacting an organoaluminum compound of the formula $(R)_2AlOR$ and a complex of cobalt with a beta-diketone of the formula

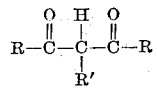

where each R is a radical selected from the group consisting of alkyl, aryl, alkaryl, aralkyl and cycloalkyl radicals each having from 1 to 8 carbon atoms per molecule and R' is selected from the group consisting of R and hydrogen.

6. The method according to claim 5 wherein the organoaluminum compound is diethylethoxyaluminum, the cobalt complex is cobalt acetylacetonate, the hydrocarbon diluent is a mixture of benzene and cyclohexane and the catalyst system is present in the hydrocarbon diluent in an amount of from about 0.5 to about 10 weight percent of the mixture of diluent and catalyst system.

7. A catalyst for converting ethylene to butenes consisting essentially of a reaction mixture of an organoaluminum compound of the formula $(R)_2AlOR$ and a complex of cobalt with a beta-diketone of the formula

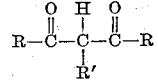

where each R is a radical selected from the group consisting of alkyl, aryl, alkaryl, aralkyl and cycloalkyl radicals having from 1 to 8 carbon atoms per molecule and R' is selected from the group consisting of R and hydrogen.

8. The catalyst according to claim 7 wherein R is an alkyl radical having from 1 to 4 carbon atoms per molecule and R' is hydrogen and the organoaluminum compound and cobalt complex are reacted at a temperature in the range of from about 0 to about 200° C.

9. A catalyst for converting ethylene to butenes consisting essentially of a reaction mixture of diethylethoxyaluminum and cobalt acetylacetonate wherein the mol ratio of the diethylethoxyaluminum to cobalt acetylacetonate is in the range of from about 2/1 to about 100/1.

References Cited

UNITED STATES PATENTS

| | | | |
|---|---|---|---|
| 3,113,115 | 12/1963 | Ziegler et al. | 252—429 |
| 3,206,522 | 9/1965 | Poe et al. | 260—683.15 |
| 3,215,682 | 11/1965 | Farrar et al. | 260—683.15 X |
| 3,306,732 | 2/1967 | Toyoshima et al. | 260—677 X |

PAUL M. COUGHLAN, JR., *Primary Examiner.*